United States Patent
Dykstra-Erickson et al.

(10) Patent No.: US 9,442,693 B2
(45) Date of Patent: Sep. 13, 2016

(54) REDUCING SPEECH SESSION RESOURCE USE IN A SPEECH ASSISTANT

(71) Applicant: Nuance Communications, Inc., Burlington, MA (US)

(72) Inventors: Elizabeth A. Dykstra-Erickson, San Francisco, CA (US); Jared L. Strawderman, San Jose, CA (US)

(73) Assignee: Nuance Communications, Inc., Burlington, MA (US)

(*) Notice: Subject to any disclaimer, the term of this patent is extended or adjusted under 35 U.S.C. 154(b) by 145 days.

(21) Appl. No.: 13/910,006

(22) Filed: Jun. 4, 2013

(65) Prior Publication Data

US 2014/0207469 A1     Jul. 24, 2014

Related U.S. Application Data

(60) Provisional application No. 61/755,940, filed on Jan. 23, 2013.

(51) Int. Cl.
*G06F 3/16*     (2006.01)
*G06F 1/32*     (2006.01)
*G06F 17/30*    (2006.01)
*G10L 15/22*    (2006.01)
*G10L 15/30*    (2013.01)

(52) U.S. Cl.
CPC .......... *G06F 3/167* (2013.01); *G06F 1/3203* (2013.01); *G06F 1/3287* (2013.01); *G06F 17/30026* (2013.01); *G10L 15/22* (2013.01); *G10L 15/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,175,224 | B2* | 5/2012 | Kirchmeier | G06Q 10/06 340/573.1 |
| 8,515,766 | B1* | 8/2013 | Bringert | G10L 15/22 704/251 |
| 2002/0055844 | A1* | 5/2002 | L'Esperance | H04M 1/271 704/260 |
| 2003/0227381 | A1* | 12/2003 | Best, Jr. | G08B 25/08 340/531 |
| 2005/0033582 | A1* | 2/2005 | Gadd | G06Q 30/02 704/277 |
| 2007/0143115 | A1* | 6/2007 | Falcon | G01C 21/26 704/270.1 |
| 2009/0112463 | A1* | 4/2009 | Yamane | G01C 21/3469 701/533 |
| 2012/0265528 | A1* | 10/2012 | Gruber | G10L 15/18 704/235 |

* cited by examiner

*Primary Examiner* — Huyen Vo
*Assistant Examiner* — Yi-Sheng Wang
(74) *Attorney, Agent, or Firm* — Banner & Witcoff, Ltd.

(57) ABSTRACT

A method of utilizing a speech assistant, the speech assistant designed to provide a voice input and speech output capability, the method comprising, enabling the use of the speech assistant for communication with a user, and terminating the speech assistant when the communication is complete. The method further comprises receiving a notification from a native application associated with the communication, and activating a sub-portion of the speech assistant, to enable outputting of the notification using speech output, thereby enabling the use of speech output for periodic announcements without enabling the speech assistant.

20 Claims, 8 Drawing Sheets

REDUCING SPEECH SESSION RESOURCE USE IN A SPEECH ASSISTANT

RELATED APPLICATION

This application claims priority to U.S. Provisional Application No. 61/755,940, filed on Jan. 23, 2013, which is incorporated by reference in its entirety.

FIELD

This application relates to speech, and more particularly to reducing resource use in a system including a speech assistant

BACKGROUND

As speech becomes more common as an interface, speech tools are becoming more common. However, speech tools use significant resources, including bandwidth, memory, and processing. This may be problematic, especially on mobile devices with resource limitations.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The present system enables the sustaining of a conversational context with a user, without occupying speech session resources. In general, a speech session takes up significant bandwidth, memory resources, and processing power, and thus uses a fair amount of battery power. However, in some situations after an initial conversation is completed, it may be useful to continue providing speech-based feedback on the process. Therefore, the present system enables releasing of the speech session resources by passing control of the system to a native application when no immediate interaction is needed. However, despite releasing the speech session, the present invention enables the use of the output portion of the speech assistant to provide speech notifications to the user. In one embodiment, this enables the exposure of the progress of a business process that is not typically exposed in the native application user interface.

In one embodiment, the native application sets a timer, so that when a notification is received the native application can activate the speech assistant, for the purposes of providing a speech-based output. In another embodiment, the native application monitors status updates and uses the speech assistant to enable speech-based notification, when appropriate.

In one embodiment, the speech assistant is not fully activated for the speech notifications, but rather activated only to provide speech output, without turning on listening, speech processing, or other aspects of the speech assistant. This reduces the resource consumption by the speech assistant.

The following detailed description of embodiments of the invention make reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
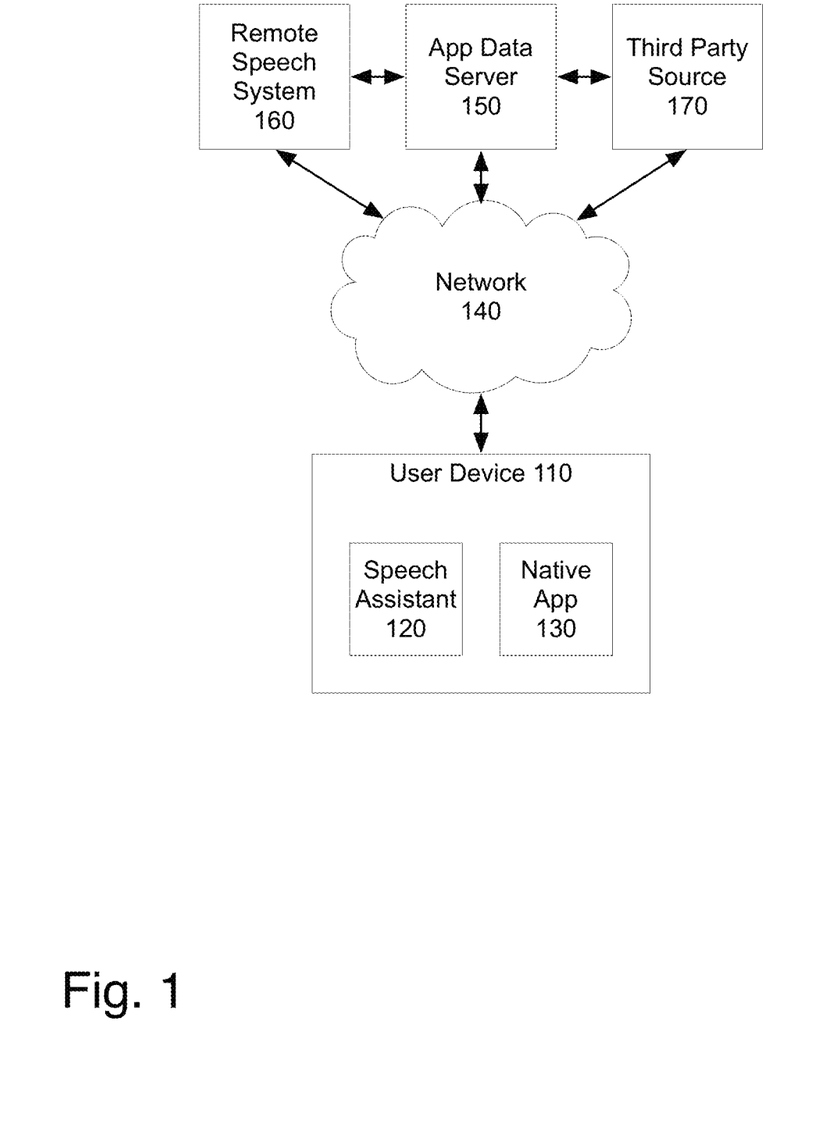
FIG. 1 is a network diagram illustrating one embodiment of the network in which the speech assistant may be implemented.

FIG. 1 is a network diagram illustrating one embodiment of the network in which the speech assistant may be implemented. The network includes a user device 110, coupled to a network 140 in one embodiment. User device 110 includes a native application 130 and a speech assistant 120. In one embodiment, the native application 130 and speech assistant 120 may be a single application with the native application portion providing underlying functionality while the speech assistant portion provides multimodal user interface features. In another embodiment, the native application 130 may be a separate application, with a speech assistant interfacing to provide the multimodal user interface.

In one embodiment, user device 110 includes one or more native applications 130. A native application 130, in one embodiment, may be any application that receives data from the user and/or provides information to the user. The information communicated to the user by the native application 130 may be obtained from application data server 150, third party source 170, from within the application 130, or from other resources on the user device 110, server 150, or elsewhere.

The speech assistant 120, in one embodiment, resides on the user device 110. Speech assistant 120 is used to provide a multimodal Input/Output (I/O) to the native application 130. Multi-modal I/O, in one embodiment, enables text, speech, movement, gesture, touch, and non-speech sound input and output. In one embodiment, speech assistant 120 interacts with remote speech system 160. In one embodiment, the speech analysis and/or text-to-speech features are provided using remote speech system 160. In one embodiment, speech assistant 120 passes data to remote speech system 160 for interpretation. In one embodiment, remote speech system 160 interacts with application data server 150, to enable a user to interact with the native application 130 through speech or other user interface features.

Application data server 150 may provide data to native application 130. In one embodiment, the native application 130 may also obtain data from third party sources 170, either directly or mediated through application data server 150.

Figure 2:
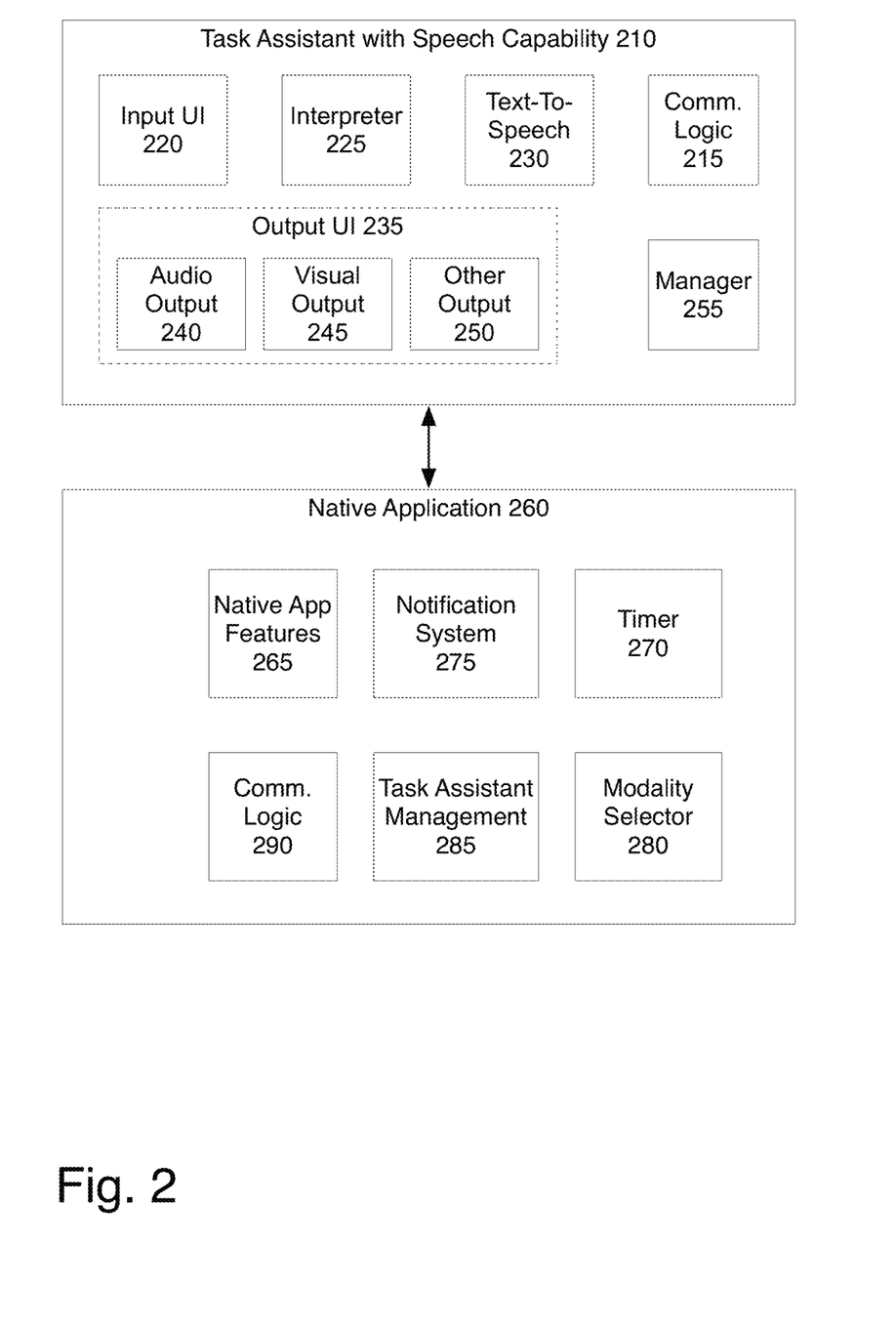
FIG. 2 is a block diagram of one embodiment of the speech assistant and native application.

FIG. 2 is a block diagram of one embodiment of the speech assistant and native application. The task assistant with speech capability 210, in one embodiment, is an application associated with the native application 260 that provides a multimodal interface to the native application 260. The task assistant with speech capability 210 includes an input UI 220. The input UI 220, in one embodiment, may include various forms of input such as voice, text, motion, etc. The interpreter 225 interprets inputs. In one embodiment, the interpreter 225 may work with remote speech system (not shown) to determine the command, instruction, or request entered by the user. The interpreted input is passed to the native application 260, or the application server (not shown), either directly by task assistant 210 or through the remote system. In response to the command, instruction, or request, the native application or application server may provide some data to be output to the user. This data, or result, is received by the task assistant 210. These results, in one embodiment, are passed to output user interface 235.

Output user interface 235 enables the system 210 to output information in various formats. Output user interface 235, in one embodiment, includes audio output 240, visual output 245, or other output formats. Audio output may include speech, tones, or other sounds, while visual output may include text, images, icons, etc. In one embodiment, the results are returned to task assistant 210 in form associated with the native application, and text-to-speech system 230 translates the results into speech format, for voice output 240. The form in which results are returned may range from plain text, to HTML, XML, multimedia, or other formats.

Manager 255 controls the parts of the task assistant 210. In general use, the task assistant 210 is monitoring input, generating output, and communicating with the native application or other systems, using communication logic 215. In one embodiment, manager 255 can enable and disable portions of the task assistant 210. In one embodiment, manager 255 can activate a sub-portion of the task assistant 210. For example, in one embodiment, manager 255 can be used to activate only the text-to speech 230 and audio output 240 aspects of the task assistant 210. This reduces the memory, processing power, bandwidth, and battery consumed by the task assistant 210.

The native application 260 interacts with task assistant 210, application server (not shown), and optionally third party sources (not shown), via communication logic 290. In one embodiment, native application 260 includes native application features 265. These features may provide purchasing, banking, insurance, or other services. In one embodiment, the native application may interact with remote application server (not shown). For example, if native application 260 is a banking application, it may obtain data from the bank's server, regarding the user's balance, and enabling the user to pay bills, etc.

In one embodiment, native application 260 includes notification system 275. Notification system receives process status updates from the native application features 265, when certain steps occur in the processing. In one embodiment, the process status updates are generated by the application server. In one embodiment, the process status updates are generated in the network/cloud. Alternatively, the process status updates may be generated by the native application itself 260.

In one embodiment, modality selector 280 determines whether and how the notification should be output to the user. In one embodiment, modality selector 280 further determines whether the notification should be passed to task assistant, to be output as speech or sound notification. If the modality selector 280 determines that the notification should be output as speech, task assistant management 285 activates a sub-portion of task assistant 210, using manager 255, to enable the notification to be output as audio output. In one embodiment, the sub-portions of the task assistant 210 activated include the text-to-speech 230 and audio output 240 only. As noted above, by activating only a portion of the task assistant 210, the bandwidth, memory footprint, processor use, and battery drain is minimized.

In one embodiment, the notification system 275 triggers modality selector 280 such that each time a notification is received from native application features 265 or from application server or third party, the modality selector 280 makes the determination whether to output the notification to the user as via speech assistant 210.

In one embodiment, notification system 275 receives notifications. However, modality selector 280 is triggered by timer 270. When timer triggers the modality selector 280, modality selector evaluates any queued notifications and outputs any relevant notifications via speech assistant 210 as described above.

Although speech assistant 210 and native application 260 are illustrated as separate logical blocks in FIG. 2, one of skill in the art would understand that the speech assistant features can be integrated into the native application. Furthermore, some or all of these elements may reside on the user's mobile device or a remote system. In one embodiment, only the input UI and output UI may reside on the mobile system, while all other processing takes place in the cloud or on a remote server.

Figure 3:
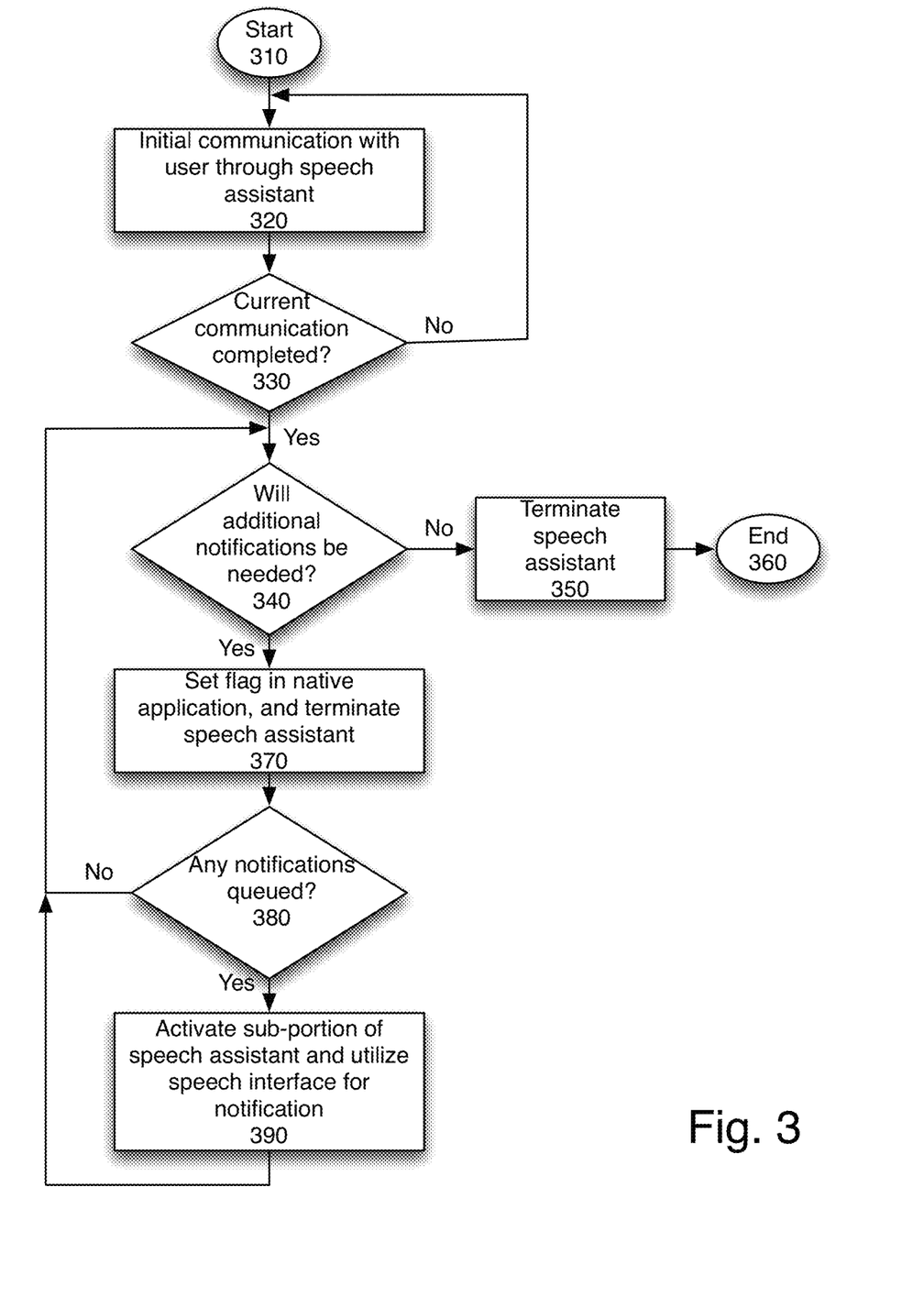
FIG. 3 is an overview flowchart of one embodiment of resource release with a speech assistant.

FIG. 3 is an overview flowchart of resource release with a speech assistant. The process starts at block 310. In one embodiment, the process starts when the user initiates the speech assistant, in connection with an interaction with an underlying native application. At block 320, the user has an initial communication with the native application through the speech assistant. The communication may range from ordering something, requesting data, initiating a transaction or another process, or any other type of interaction that may be performed using a computer system interacting with an underlying server.

At block 330, the process determines whether the current communication is complete. If not, the process returns to block 320, to continue communicating with the user through the speech assistant. As noted above, the speech assistant in one embodiment provides a multimodal input/output system that enables multimodal communication with the native application.

If the current communication is completed, at block 330, the process continues to block 340. At block 340, in one embodiment, the process determines whether additional notifications will be needed. In one embodiment, certain interactions include further notifications. For example, when the user initiates a process that is not completed during the communication, notification about the status of the process may be useful. On the other hand, if the user's communication did not initiate any actions that remain to be completed, there may be no further notifications. If no further notifications are needed, at block 350 the speech assistant is terminated. The process then ends at block 360.

If there are further notifications needed, the process continues to block 370. At block 370, a flag is set in the native application. The flag indicates to the native application that the communication was initiated with the speech assistant, and that notifications may be sent to the speech assistant for speech output.

At block 380, the process determines whether there are any notifications queued. If no notifications are queued, the process returns to block 340, to determine whether any further notifications are needed. It should be understood that this process may be interrupt driven. Thus, this loop may be replaced with a logic that awaits notifications. In one embodiment, the system periodically determines whether the flag should be expired, whether or not notifications have been queued. In one embodiment, when the process initiated through the initial communication is completed, the flag is unset, so that no further notifications will trigger the speech assistant.

If, at block 380, the process determines that there are queued notifications, the process continues to block 390. At block 390, a sub-portion of the speech assistant is activated, and the speech interface is used to output the notification. In one embodiment, this is done in addition to a text-based notification. In one embodiment, the text-based notification is output by the native application directly. In one embodiment, the text-based notification may be delivered through a mechanism provided through the operating system of the device for distributing notification. In one embodiment, the notification may be presented as a system-modal notification. In another embodiment, the text-based notification may be done through the task assistant.

The process then returns to block 340, to determine whether there are further notifications to be made.

Figure 4:
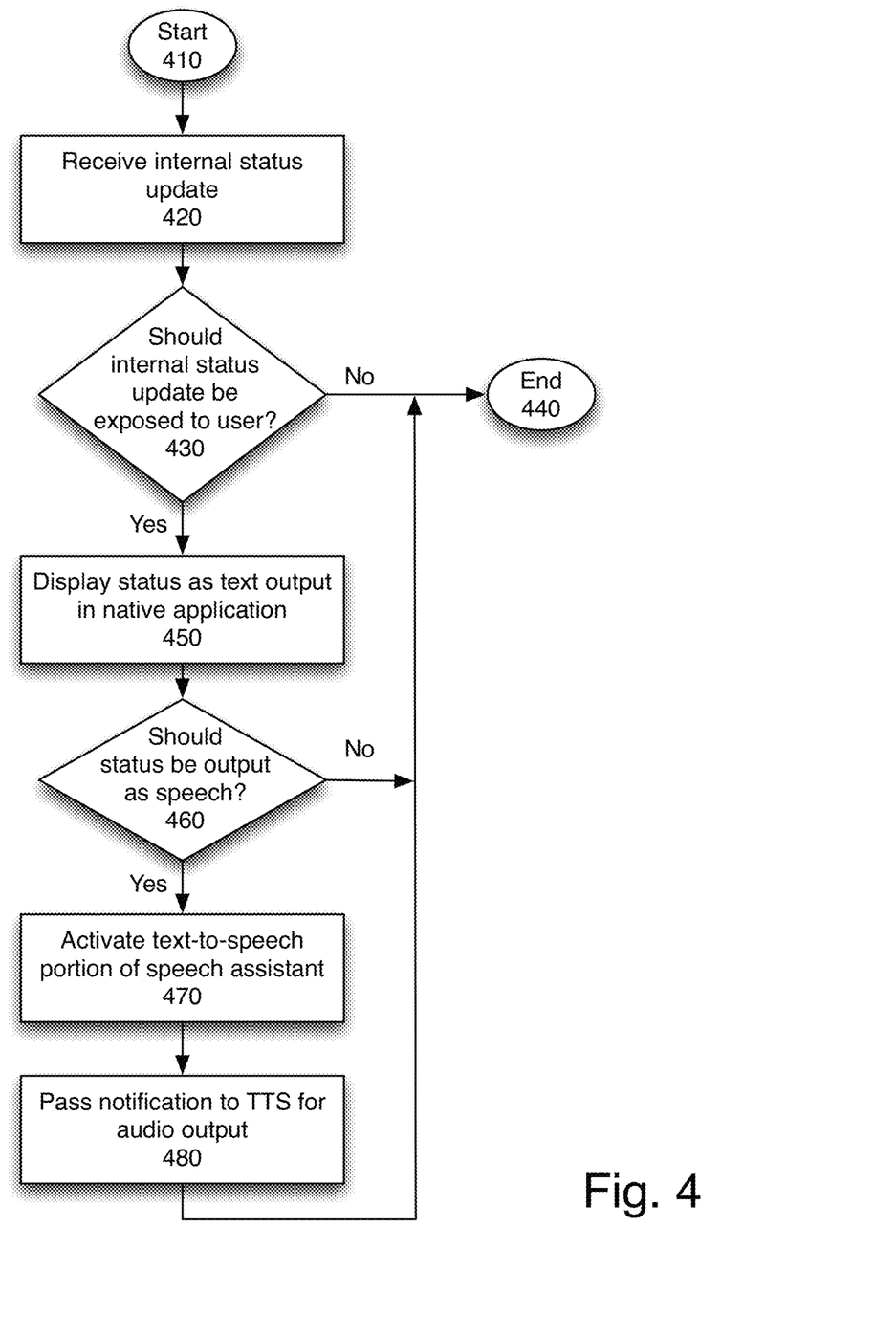
FIG. 4 is a flowchart of one embodiment timing selection.

FIG. 4 is a flowchart of one embodiment of notification selection. In one embodiment, this flowchart is the more detailed example of block 380, determining if any notifications are queued for output to the speech interface. The process is initiated at block 410, when a status update is received.

At block 420, an internal process status update is received. In one embodiment, as a process is executed, the system provides internal status updates to the native application on the user's device. For example, the internal status updates may include notices of changes in execution state. In one embodiment, these internal status updates are used to provide information to the user about a current status of a process that is usually not transparent to the user.

At block 430, the process determines whether the internal status update should be exposed to the user. In one embodiment, the process may select a subset of internal status updates that it would consider useful notifications. For example, a simple call to a tow truck may generate dozens of status updates. Status updates may include: task assigned to dispatcher, contacting company one, company one indicates availability, company one has assigned a tow truck, tow truck driver has been assigned, company one has dispatched a tow truck, tow truck has left, regular reporting on current location of the tow truck (e.g. truck is 25 miles from the site, the tow truck is five miles from the site, or the tow truck is one mile from the site), tow truck has arrived. Of these status updates, only a few may be exposed to the user, so as not to inundate the user with notifications. FIG. 5E illustrates an exemplary set of internal process status updates, showing the few that are selected to become notifications for the user.

In one embodiment, multiple internal status updates may be collapsed into a smaller number of messages. For example, in the above example, the notification may have a single announcement based on the data that the towing company has been contacted, the tow truck assigned, and dispatched. Thus the system may provide a single notification message, though each of these may generate one or more internal status updates.

In one embodiment, the system may set a timer, to ensure that internal status updates are not provided too frequently. Thus, the process may determine that the internal status update should not be exposed to the user, based on content of the status update and/or timing of the status update. If the internal status update should not be exposed to the user, the process ends at block 440.

If the system determines that the status update should be exposed to the user, the process continues to block 450. At block 450, the status is displayed as text output. In one embodiment, this is done through the native application. In one embodiment, this is done through an interstitial display. In one embodiment, this may be done through the user device's notification API.

At block 460, the process determines whether the status should be output via speech. In one embodiment, when the interaction was initiated via the speech assistant, the system preferentially also outputs the notifications through the speech interface. In one embodiment, for certain interactions, such as confidential interactions, the system may determine not to output the notification as speech. If the system determines not to output the status notification via speech, the process ends at block 440. In one embodiment, fi the notification is not output as speech, the system may provide an alternative notification method, such as a vibration. visual notification, or other notice, to alert the user to the presence of a text status update. Otherwise, the process continues to block 470.

At block 470, the text-to-speech portion of the speech assistant is activated. At block 480, the system passes the notification to the text-to-speech portion of the speech assistant. The text to speech portion translates the text notification into speech. In one embodiment, the speech notification may not be identical in format to the text notification. In one embodiment, if that is the case, the native application provides the appropriate speech notification to the TTS system. The TTS system passes the converted notification to the speech output, which outputs the notification as speech. The process then ends at block 440. In this way, when the interaction is initiated through the speech interface, or when the system determines that the use of the speech interface would be advantageous, the system can maintain the facade of the speech interface, without requiring continuous maintenance of the speech assistant.

This process may be better understood through some examples, illustrated in FIGS. 5A-5D. One example may be a native application that provides roadside assistance, for example through an application provided by an insurance company, illustrated as FIG. 5A. The request is received, and handled with resolution to the user. However, after the initial communication is complete, additional steps need to take place. No conversation is necessary, but since the activity was generated through the speech interface, the speech interface may be used to announce the progress of the task. After the initial interaction is complete, the system may use the speech assistant to announce, "Your request for a tow truck has been dispatched to a driver." Some time later, when the internal system receives the data, the speech assistant may be used to announce, "Your tow truck will arrive in 20-45 minutes," and finally the announcement may say, "Your tow truck has arrived." In this way, the interaction initiated through a speech interface maintains the facade of the speech interface, without requiring continuous maintenance of the speech assistant.

Figure 5A:
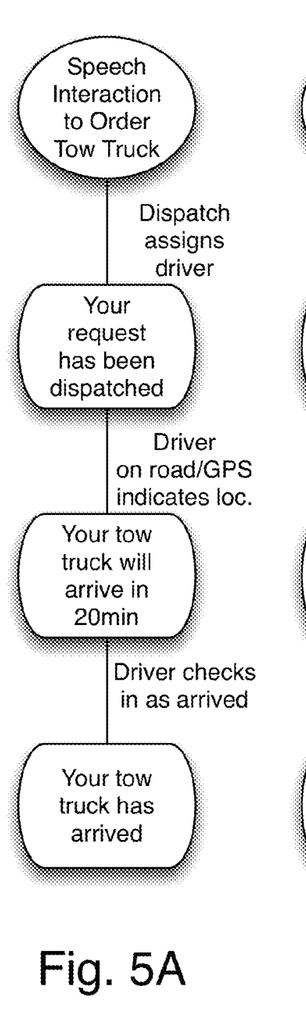
FIGS. 5A-5E show some exemplary use case cases of communication.
Figure 5B:
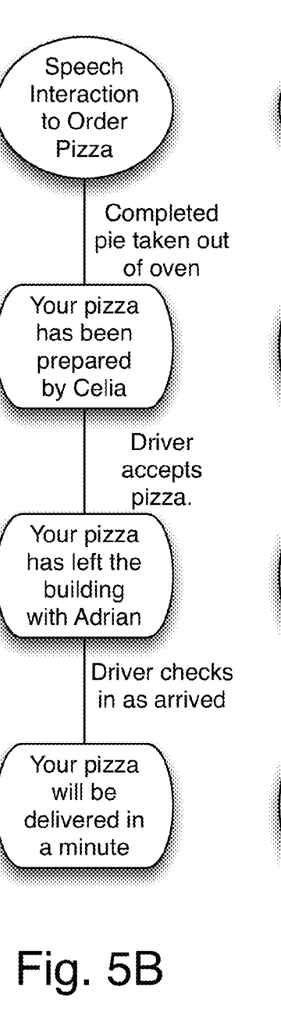

Another example may be in a system providing pizza delivery, shown in FIG. 5B. The interaction may be initiated through the speech assistant. Once the initial order is complete, notifications may be provided to inform the user of the stages of preparation and delivery. In this example, the notification can use the speech assistant to announce the processing stages: "Your pizza has been prepared by Celia." "Your pizza has left the building with Adrian." "Your pizza will be delivered in the next minute."

Figure 5C:
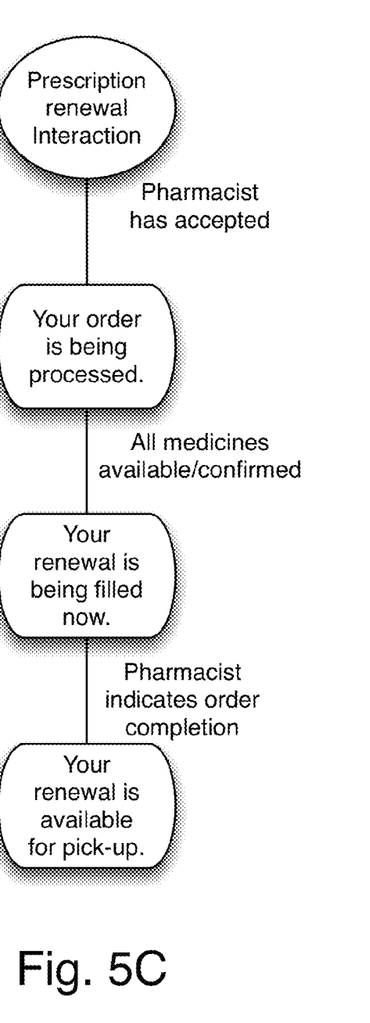

Another example may be the purchase of a ticket to reserve a seat to an event. The initial reservation request may be made through the speech assistant. Once that request is handled but not confirmed, the notification involves notifying the user of the time left to purchase the ticket. 'Your request has been entered.' 'You have 24 hours to complete the ticket purchase.' If no confirmation is received, the system may announce, 'Your ticket reservation will be cancelled in 60 minutes.' When confirmation is received, the system may provide the notification that 'Your confirmation has been received, you have completed the purchase of two seats, 6J and 6K.' Other examples should be apparent to one with skill in the art.

Figure 5D:
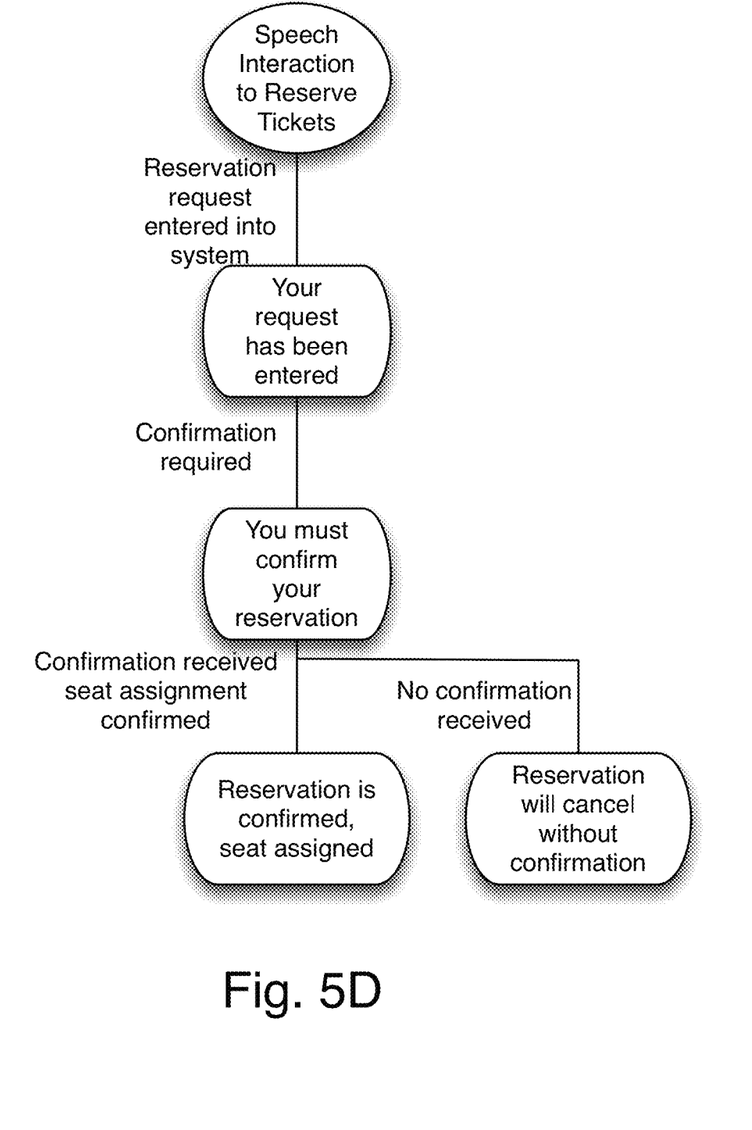
Figure 5E:
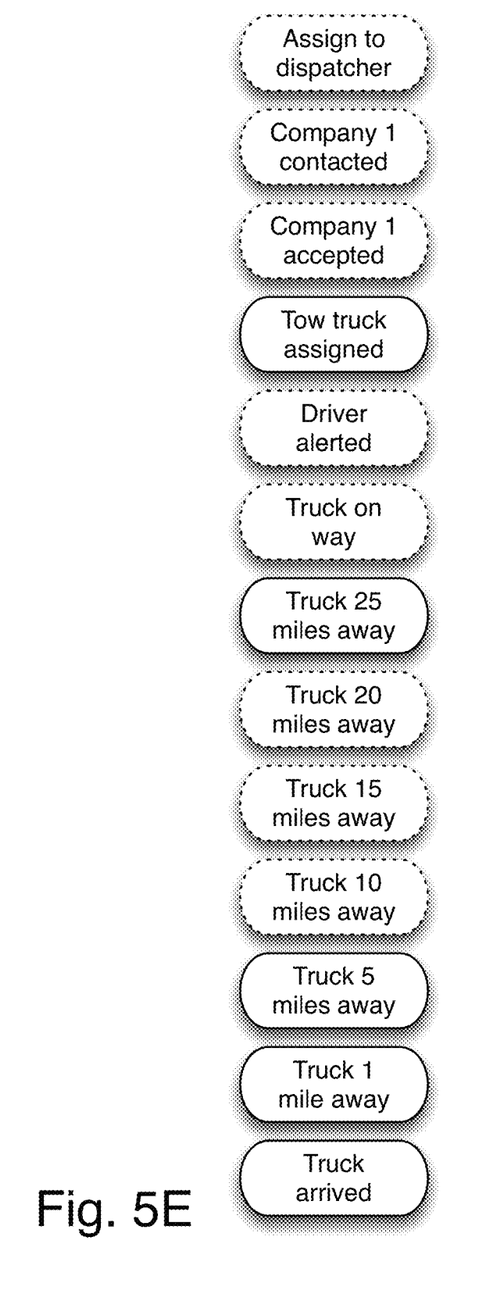

Another example may be the reporting on the processing of a pharmacy order, shown in FIG. 5D. The system uses the notifications to assure the user that the processing is occurring, and to provide an indication when the order is ready for pick-up. Of course, if the pharmacy cannot fill an order or another issue arises, the system would be able to provide notification of that as well.

Figure 6:
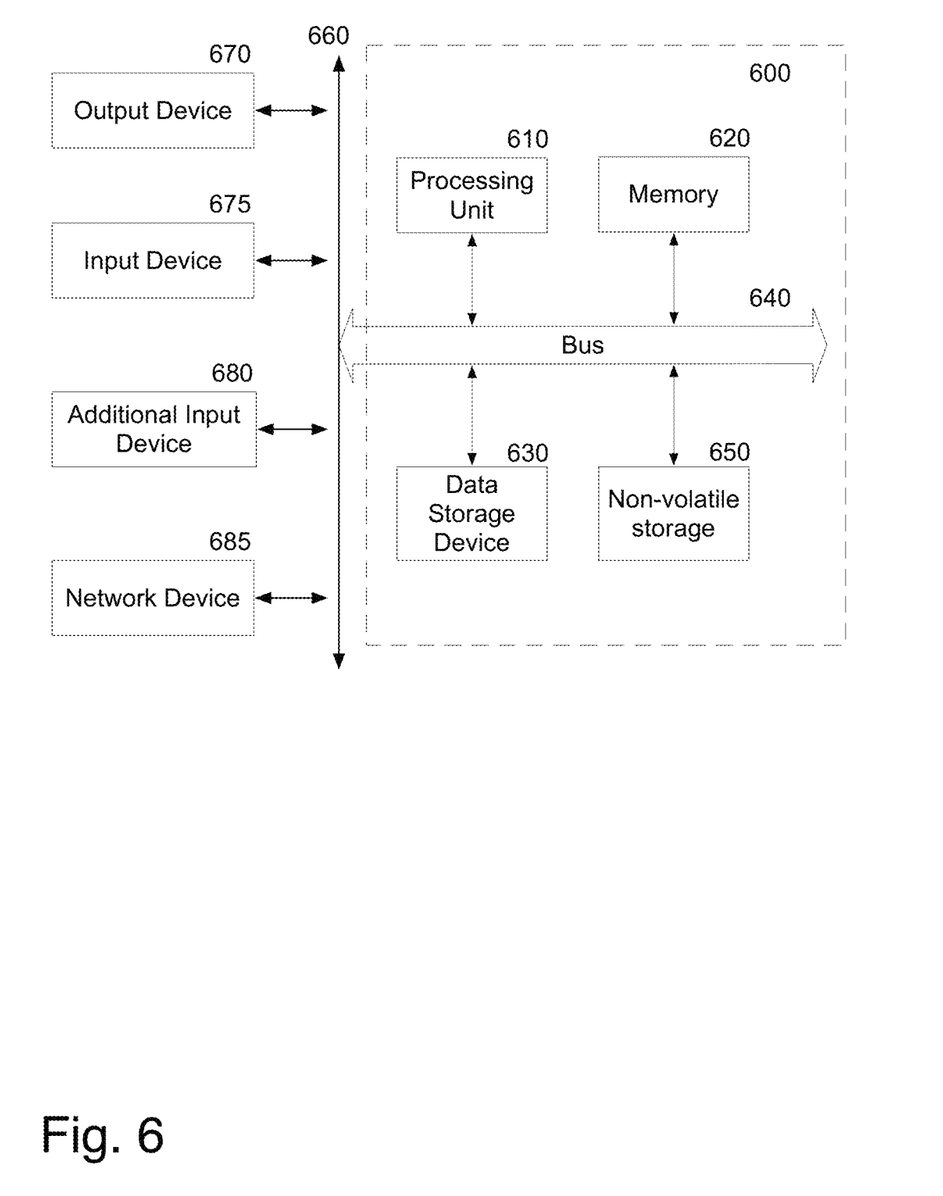
FIG. 6 is a block diagram of one embodiment of a computer system.

FIG. 6 is a block diagram of a particular machine that may be used with the present invention. It will be apparent to those of ordinary skill in the art, however that alternative systems of various system architectures may also be used.

The data processing system illustrated in FIG. 6 includes a bus or other internal communication means such as bus 640 for communicating information, and a processing unit 610 coupled to the bus 640 for processing information. The processing unit 610 may be a central processing unit (CPU), a digital signal processor (DSP), or another type of processing unit 610.

The system further includes, in one embodiment, a random access memory (RAM) or other volatile storage device 620 (referred to as memory), coupled to bus 640 for storing information and instructions to be executed by processor 610. Main memory 620 may also be used for storing temporary variables or other intermediate information during execution of instructions by processing unit 610.

The system also comprises in one embodiment a read only memory (ROM) 650 and/or static storage device 650 coupled to bus 640 for storing static information and instructions for processor 610. In one embodiment, the system also includes a data storage device 630 such as a magnetic disk or optical disk and its corresponding disk drive, or Flash memory or other storage which is capable of storing data when no power is supplied to the system. Data storage device 630 in one embodiment is coupled to bus 640 for storing information and instructions.

The system may further be coupled to an output device 670, such as a cathode ray tube (CRT) or a liquid crystal display (LCD) coupled to bus 640 through bus 660 for outputting information. The output device 670 may be a visual output device, an audio output device, and/or tactile output device (e.g. vibrations, etc.)

An input device 675 may be coupled to the bus 660. The input device 675 may be an alphanumeric input device, such as a keyboard including alphanumeric and other keys, for enabling a user to communicate information and command selections to processing unit 610. An additional user input device 680 may further be included. One such user input device 680 is cursor control device 680, such as a mouse, a trackball, stylus, cursor direction keys, or touch screen, may be coupled to bus 640 through bus 660 for communicating direction information and command selections to processing unit 610, and for controlling movement on display device 670. An additional user input device 680 may be a microphone to receive spoken input, sensors to capture motion input, or other means of enabling the user to communicate with the computer system 600.

Another device, which may optionally be coupled to computer system 600, is a network device 685 for accessing other nodes of a distributed system via a network. The communication device 685 may include any of a number of commercially available networking peripheral devices such as those used for coupling to an Ethernet, token ring, Internet, or wide area network, personal area network, cellular network, wireless network or other method of accessing other devices. The communication device 685 may further be a null-modem connection, or any other mechanism that provides connectivity between the computer system 600 and the outside world.

Note that any or all of the components of this system illustrated in FIG. 6 and associated hardware may be used in various embodiments of the present invention.

It will be appreciated by those of ordinary skill in the art that the particular machine, which embodies the present invention may be configured in various ways according to the particular implementation. The control logic or software implementing the present invention can be stored in main memory 620, mass storage device 630, or other storage medium locally or remotely accessible to processor 610.

It will be apparent to those of ordinary skill in the art that the system, method, and process described herein can be implemented as software stored in main memory 620 or read only memory 650 and executed by processor 610. This control logic or software may also be resident on an article of manufacture comprising a computer readable medium having computer readable program code embodied therein and being readable by the mass storage device 630 and for causing the processor 610 to operate in accordance with the methods and teachings herein.

The present invention may also be embodied in a handheld or portable device containing a subset of the computer hardware components described above. For example, the handheld device may be configured to contain only the bus 640, the processor 610, and memory 620 and/or 650.

The handheld device may be configured to include a set of buttons or input signaling components with which a user may select from a set of available options. These could be considered input device #1 675 or input device #2 680. The handheld device may also be configured to include an output device 670 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 610, a data storage device 630, a bus 640, and memory 620, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network connection 685.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 610. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.)

The system may also be implemented on various other devices that can provide a speech interface as well as other interface formats. Such devices may include television screens, vehicle displays, tablet devices, cellular telephones, or any other devices that provide multiple formats for input and output, including speech output.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
    activating a speech assistant for performing an interactive speech process with a user, the speech assistant comprising a speech input function and a speech output function; and
    performing, using the speech assistant, the interactive speech process, which comprises:
        conducting an initial communication with the user;
        conditioned upon a determination that the initial communication is complete, deactivating the speech input function and the speech output function;
        while the speech input function and the speech output function are deactivated, queuing a plurality of process statuses generated for the interactive speech process;
        while the speech input function and the speech output function are deactivated, determining which of the plurality of process statuses are to cause activation of the speech output function, resulting in first subset of the plurality of process statuses that is to cause activation of the speech output function, and a second subset of the plurality of process statuses that is not to cause activation of the speech output function;
        activating the speech output function;
        while the speech input function is deactivated, using the speech output function to output one or more speech notifications based on the first subset; and
        after using the speech output function to output the one or more speech notifications, deactivating the speech output function a second time.

2. The method of claim 1, wherein the speech output function comprises a text-to-speech output function.

3. The method of claim 1, wherein performing the interactive speech process further comprises:
    after deactivating the speech output function the second time, queuing an additional plurality of process statuses generated for the interactive speech process;
    while the speech input function and the speech output function are deactivated, determining that none of the additional plurality of process statuses are to cause activation of the speech output function; and
    after determining that none of the additional plurality of process statuses are to cause activation of the speech output function, determining that the interactive speech process is complete.

4. The method of claim 3, wherein the additional plurality of process statuses is not used as a basis for outputting speech to the user.

5. The method of claim 3, wherein performing the interactive speech process further comprises:
    after the initial communication is complete and conditioned upon a determination that additional notifications are needed to complete the interactive speech process, setting a flag in a native application that generates the plurality of process statuses and the additional plurality of process statuses; and
    conditioned upon determining that the interactive speech process is complete, unsetting the flag in the native application.

6. The method of claim 5, wherein performing the interactive speech process further comprises:
    outputting, via the native application, text associated with the one or more speech notifications.

7. The method of claim 1, wherein performing the interactive speech process further comprising:
    conditioned upon determining that the interactive speech process is complete, terminating the speech assistant.

8. An apparatus comprising:
    one or more processors; and
    memory storing executable instructions that, when executed by the one or more processors, cause the apparatus to:
        activate a speech assistant for performing an interactive speech process with a user, the speech assistant comprising a speech input function and a speech output function; and
        perform, using the speech assistant, the interactive speech process, which comprises:
            conducting an initial communication with the user;
            conditioned upon a determination that the initial communication is complete, deactivating the speech input function and the speech output function;
            while the speech input function and the speech output function are deactivated, queuing a plurality of process statuses generated for the interactive speech process;
            while the speech input function and the speech output function are deactivated, determining which of the plurality of process statuses are to cause activation of the speech output function, resulting in a first subset of the plurality of process statuses that is to cause activation of the speech output function, and a second subset of the plurality of process statuses that is not to cause activation of the speech output function;
            activating the speech output function;
            while the speech input function is deactivated, using the speech output function to output one or more speech notifications based on the first subset; and
            after using the speech output function to output the one or more speech notifications, deactivating the speech output function a second time.

9. The apparatus of claim 8, wherein the speech output function comprises a text-to-speech output function.

10. The apparatus of claim 8, wherein the interactive speech process further comprises:
after deactivating the speech output function the second time, queuing an additional plurality of process statuses generated for the interactive speech process;
while the speech input function and the speech output function are deactivated, determining that none of the additional plurality of process statuses are to cause activation of the speech output function; and
after determining that none of the additional plurality of process statuses are to cause activation of the speech output function, determining that the interactive speech process is complete.

11. The apparatus of claim 10, wherein the additional plurality of process statuses is not used as a basis for outputting speech to the user.

12. The apparatus of claim 10, wherein the interactive speech process further comprises:
after the initial communication is complete and conditioned upon a determination that additional notifications are needed to complete the interactive speech process, setting a flag in a native application that generates the plurality of process statuses and the additional plurality of process statuses; and
conditioned upon determining that the interactive speech process is complete, unsetting the flag in the native application.

13. The apparatus of claim 12, wherein the interactive speech process further comprises:
outputting, via the native application, text associated with the one or more speech notifications.

14. The apparatus of claim 8, wherein the interactive speech process further comprises:
conditioned upon determining that the interactive speech process is complete, terminating the speech assistant.

15. A method comprising:
activating a speech assistant for performing an interactive speech process with a user, the speech assistant comprising a speech input function and a speech output function; and
performing, using the speech assistant, the interactive speech process, which comprises:
conducting an initial communication with the user;
conditioned upon a determination that the initial communication is complete, deactivating the speech input function and the speech output function;
while the speech input function and the speech output function are deactivated, queuing a plurality of process statuses generated for the interactive speech process;
while the speech input function and the speech output function are deactivated and conditioned upon expiration of a timer, determining that at least one process status has been queued;
while the speech input function and the speech output function are deactivated, determining which of the plurality of process statuses are to cause activation of the speech output function, resulting in a subset of the plurality of process statuses that are to cause activation of the speech output function;
activating the speech output function;
while the speech input function is deactivated, using the speech output function to output one or more speech notifications based on the subset;
after using the speech output function to output the one or more speech notifications, deactivating the speech output function a second time; and
conditioned upon a determination that additional notifications are needed to complete the interactive speech process, selecting between (a) proceeding to determine that at least one process status has been queued conditioned upon expiration of the timer a second time and (b) proceeding to terminate the speech assistant.

16. The method of claim 15, wherein the speech output function comprises a text-to-speech output function.

17. The method of claim 15, wherein the interactive speech process further comprises:
after deactivating the speech output function the second time, queuing an additional plurality of process statuses generated for the interactive speech process; and
while the speech input function and the speech output function are deactivated, determining that none of the additional plurality of process statuses are to cause activation of the speech output function.

18. The method of claim 17, wherein the additional plurality of process statuses is not used as a basis for outputting speech to the user.

19. The method of claim 17, wherein the interactive speech process further comprises:
after the initial communication is complete, setting a flag in a native application that generates the plurality of process statuses and the additional plurality of process statuses; and
conditioned upon determining that the interactive speech process is complete, unsetting the flag in the native application.

20. The method of claim 19, wherein performing the interactive speech process further comprises:
outputting, via the native application, text associated with the one or more speech notifications.

* * * * *